(12) United States Patent
Rizzi

(10) Patent No.: US 12,658,827 B2
(45) Date of Patent: Jun. 16, 2026

(54) REGULATION DEVICE

(71) Applicant: SELPRO SRL, Bagnolo Mella (IT)

(72) Inventor: Stefano Rizzi, Brescia (IT)

(73) Assignee: SELPRO SRL, Bagnolo Mella (IT)

( * ) Notice: Subject to any disclaimer, the term of this patent is extended or adjusted under 35 U.S.C. 154(b) by 201 days.

(21) Appl. No.: 18/389,511

(22) Filed: Nov. 14, 2023

(65) Prior Publication Data

US 2024/0171094 A1 May 23, 2024

(30) Foreign Application Priority Data

Nov. 18, 2022 (IT) ........................ 202022000004737

(51) Int. Cl.
| | |
|---|---|
| *H02P 7/08* | (2006.01) |
| *H02P 1/02* | (2006.01) |
| *H02P 1/08* | (2006.01) |
| *H02P 1/18* | (2006.01) |
| *H02P 7/22* | (2006.01) |
| *A47F 3/04* | (2006.01) |

(52) U.S. Cl.
CPC ............... *H02P 1/08* (2013.01); *H02P 1/022* (2013.01); *H02P 1/18* (2013.01); *H02P 7/22* (2013.01); *A47F 3/0478* (2013.01)

(58) Field of Classification Search
CPC .... H02P 7/22; H02P 1/022; H02P 1/18; H02P 1/08; H02P 7/08; A47F 3/0478
USPC ........................................................ 318/599
See application file for complete search history.

(56) References Cited

U.S. PATENT DOCUMENTS

| | | | | |
|---|---|---|---|---|
| 2006/0192544 | A1* | 8/2006 | Huang ...................... | G05F 1/56 |
| | | | | 323/367 |
| 2012/0146560 | A1* | 6/2012 | Kim .......................... | H02P 1/18 |
| | | | | 318/400.04 |
| 2015/0028783 | A1* | 1/2015 | Sato .......................... | H02P 6/34 |
| | | | | 318/400.17 |
| 2018/0234034 | A1* | 8/2018 | Manasseh ................. | H02P 1/18 |

(Continued)

FOREIGN PATENT DOCUMENTS

RU 2117227 C1 * 8/1998

OTHER PUBLICATIONS

RU2117227C1_MACHINE_ENGLISH_TRANSLATION (Year: 1998).*

*Primary Examiner* — Gabriel Agared
(74) *Attorney, Agent, or Firm* — Blank Rome

(57) ABSTRACT

A device for the regulation of devices which can be regulated with a 0-10 Vdc and/or PWM command is herein disclosed, the device having at least one power supply input, at least one regulation input adapted to receive external regulation signals, a potentiometer comprising a selector element, the potentiometer being configured to provide a manual voltage regulation, and at least one command output configured to output a command signal towards the devices to be regulated. The device further comprises a switching element configured to cause a switching of said device between a first regulation mode, in which the command signal is generated by said device and is manually adjustable through the selector element of said potentiometer, and a second regulation mode, which allows a regulation of the devices to be regulated via the command signal from the command output based on an external device connectable to the regulation input. A system comprising the above device is also disclosed.

13 Claims, 8 Drawing Sheets

(56)　　　　　　　References Cited

U.S. PATENT DOCUMENTS

2019/0089277 A1*　3/2019　Nieh ......................... B25F 5/00
2021/0159818 A1*　5/2021　Moghe ...................... H02P 1/02

* cited by examiner

External
Power Supply
24 Vac (±10%)
5,0 VA 0-10Vdc
Manual
Command 0-10Vdc Output Command

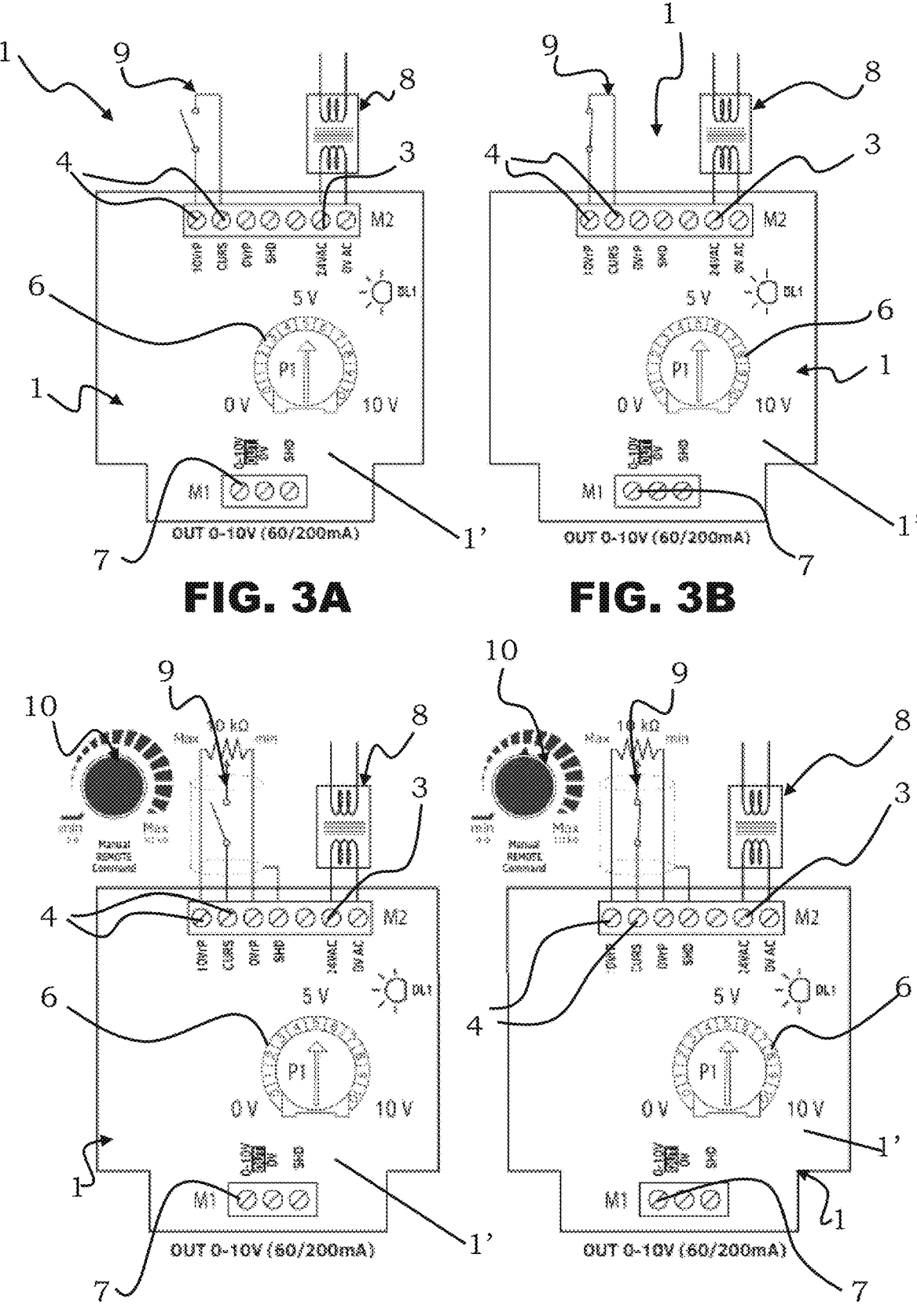
FIG. 3A        FIG. 3B
FIG. 4A        FIG. 4B

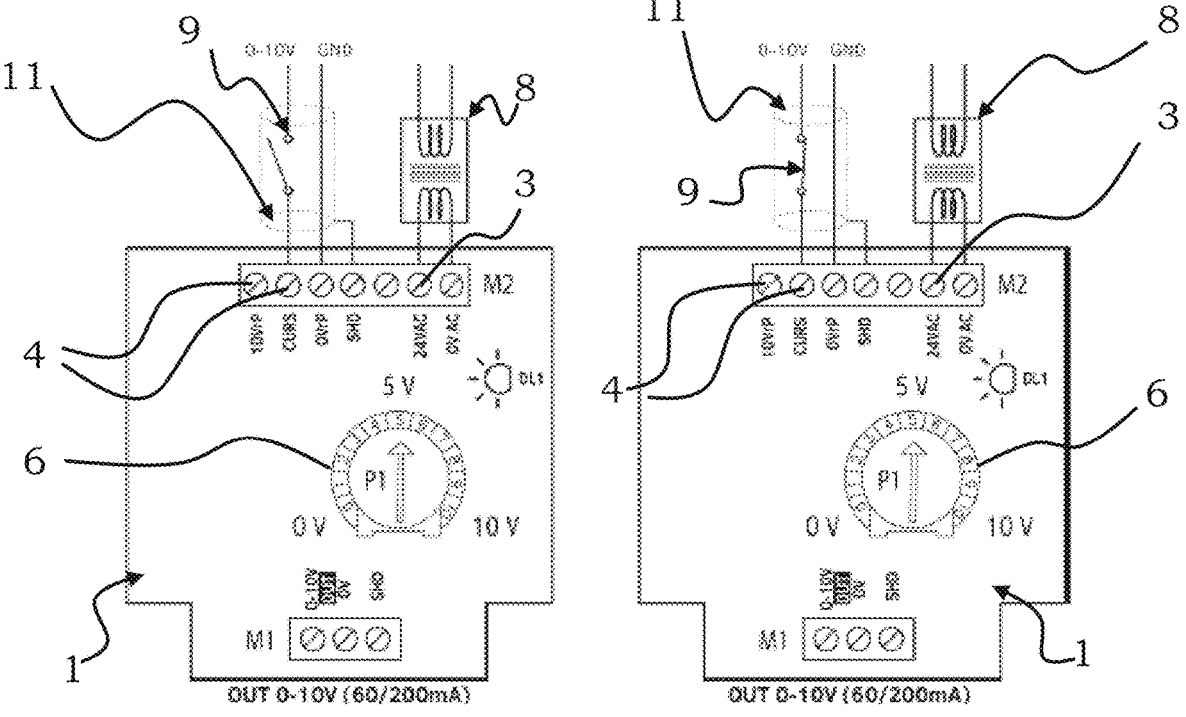
FIG. 5A          FIG. 5B

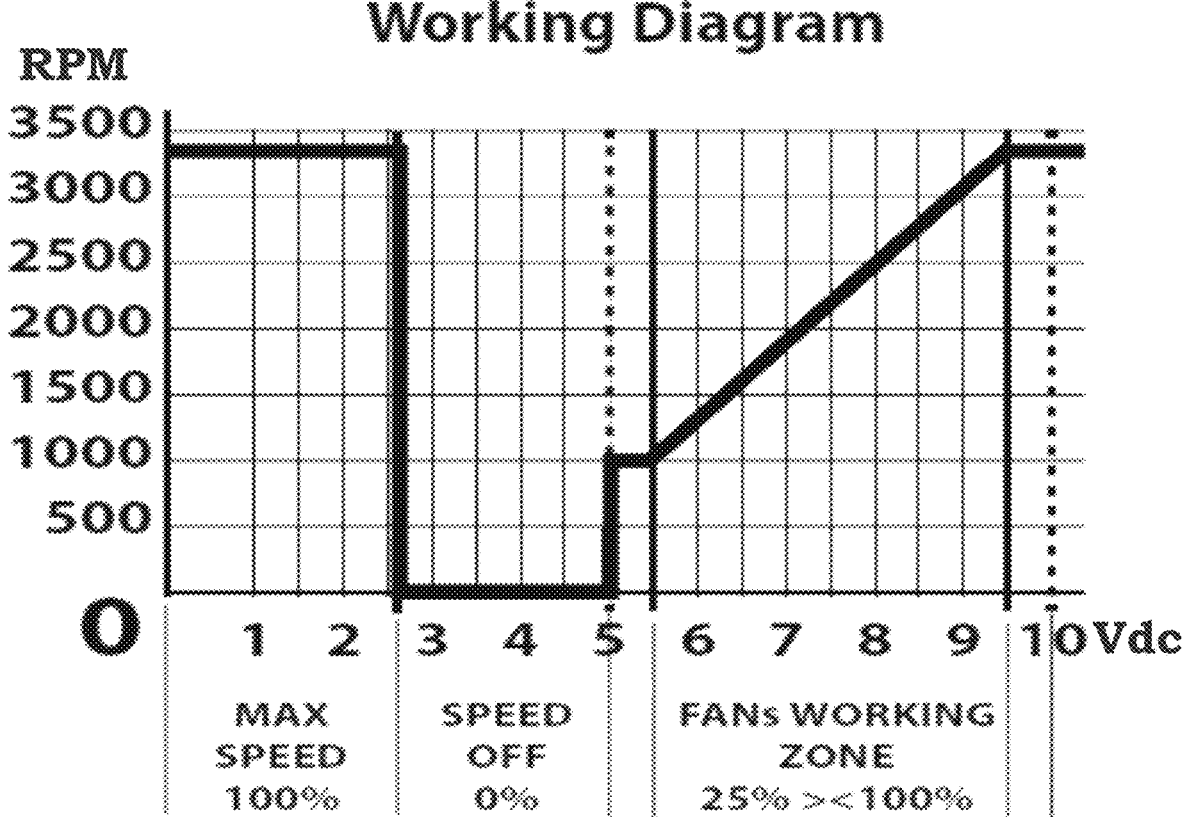
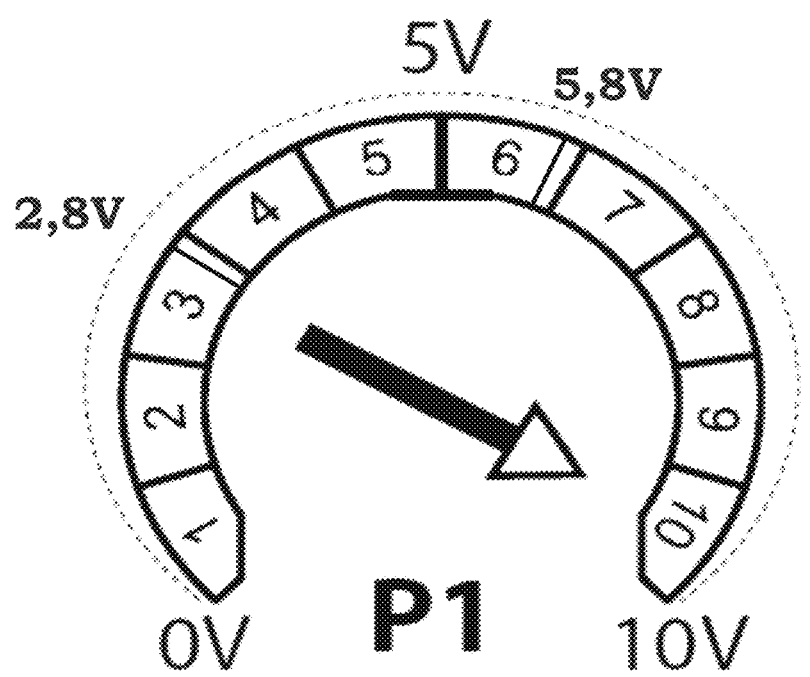
FIG. 8

REGULATION DEVICE

CROSS-REFERENCE TO RELATED APPLICATIONS

The present application claims priority to Italian Patent Application No. 202022000004737, filed on Nov. 18, 2022, the entirety of which is incorporated herein by reference.

FIELD OF APPLICATION

In its most general aspect, the present disclosure relates to a regulation device for electric/electronic devices which can be regulated with a 0-10 Vdc and/or PWM command. The present disclosure is particularly, but not exclusively, applied to the control of fan motors, motor-driven valves and motor-driven gates, slave units, thermoregulators, inverters and lighting systems, and more generally for the control of a network of actuators. The present disclosure relates to this field of application with the only purpose of simplifying the exposition thereof.

PRIOR ART

As it is well known, a 0-10 Vdc signal can be used to control devices which allow a regulation of the 0-100% type of some operating parameter thereof, such as for example fan motors, valve motors, motor-driven gates, slave units of various kinds, thermoregulators, inverters and lighting systems, to name a few.

In particular, nowadays electronic commutated motors (the so-called "EC motors") are very popular, for example in the design of ventilated heat exchangers, thanks to which it is possible to take advantage of all the potentialities and the energy saving capabilities which the heat exchangers were designed for.

The EC motors, which are applied to different types of fans such as for example axial-radial-centrifugal fans, are arranged to be managed by a command signal, namely by a specific regulation command, which can be both a command based on a specific communication protocol and a hardware command such as, for example, a voltage command of the 0-10 Vdc type.

In the specific case of EC motors, the 0-10 Vdc command allows a basic regulation, by adjusting for example the fan speed, based on the system requirements, while simplifying installation problems.

The EC motors are generally managed by a local or remote master device, which controls the functions thereof and enables the motor to perform the regulation instructions.

Although the currently known solutions allow managing single devices, they still have some critical issues, in particular when the regulation is carried out for a group of devices (for example a group of electric actuators). For example, the electric actuators managed in an analogic network need a stabilized and boosted command signal, i.e. a current command signal (mA) so as to generate the boosted and amplified command towards the network of electric systems.

Moreover, with the known solutions it is not always possible to ensure the continuity of the regulation command.

Moreover, the known solutions do not allow a command emergency management in case of a failure (e.g., partial failure) of a plant/system.

Furthermore, the known solutions do not provide for the possibility of remodulating and amplifying the command signal according to the needs and/or the operational requirements.

For this reason, an object of the present disclosure is to solve the drawbacks of the prior art, providing a device which has at the same time a very simple structure and use.

A further object is to provide a solution which is suitable for all the 0-10 Vdc, and possibly also PWM, command systems.

A still further object of the disclosure is to provide a solution which allows to work in different operational modes.

Finally, a further object is to provide a solution which can be implemented also in pre-existing systems.

SUMMARY

In its most general form, the present invention provides an aggregated device which can be interposed between the devices to be regulated (for example fan motors) and the power supply and/or external command thereof (for example a local or remote master system) to provide an adjustable 0-10 Vdc and/or PWM command. In other words, the present disclosure provides an electronic potentiometer (in particular an electronic command signal) for managing in a network a command signal (e.g., a continuous command signal), which is received and/or generated both in the manual and in the automatic mode, for one or more devices (e.g., electric actuators such as motors).

Based on this idea, the above objects are achieved by a regulation device for the regulation of devices which can be regulated with a 0-10 Vdc and/or PWM command, comprising at least one power supply input (e.g., from the mains or, less preferably, a battery unit), at least one regulation input adapted to receive external regulation signals, a potentiometer comprising a selector element (e.g., an assembly comprising a rotating shaft connected to a wiper for the regulation of different voltage levels, i.e. a slider), the potentiometer being arranged (configured) to provide a manual voltage regulation, and at least one command output configured to output a command signal, for example of the 0-10 Vdc and/or PWM type, towards the devices to be regulated. According to the disclosure, the device further comprises a switching element configured to cause a switching of said device between a first regulation mode, in which the command signal is generated by said device itself (e.g., by means of electric components thereof, e.g., connected to the power supply input and using said supply) and is manually adjustable through the selector element of said potentiometer (i.e., a regulation mode which allows a manual regulation through said potentiometer based on a signal generated internally by said device itself), and a second regulation mode, which allows a regulation of the devices to be regulated via the command signal from the command output based on an external device connectable to the regulation input, which is configured to house said external device (e.g., allowing a control based on an external signal which is input from the external device through the regulation input).

The switching element is not limited by a particular type and is in combination with the potentiometer for the switching from the first regulation mode to the second regulation mode and vice-versa.

The switching between the first regulation mode and the second regulation mode can be manual or automatic (for example when an external ON-OFF contact switch is present, as it will be disclosed below).

Advantageously, this allows to provide from the outside (for example, remotely) the operating parameters of the connected operating devices to be controlled (e.g., of the fan motors), following for example a preset rule of operation, as well as to switch the operation from an automatic regulation to a manual regulation and vice versa so as to manage different specific operational requirements by simply acting on the potentiometer in the first regulation mode or by simply enabling the second regulation mode, obtaining a versatile, flexible, and easy-to-use system which allows an optimal management with the 0-10 Vdc and/or PWM command of the devices connect to the command output thereof.

It is noted that, in the context of the present disclosure, the term "manual regulation" means the regulation of the output command (for example a voltage) which is selected by the user by acting on the selector element of the potentiometer of the device of the disclosure, which is able to generate such a command starting from the power supply voltage.

More particularly, the disclosure comprises the following additional and optional features, taken individually or in combination if necessary.

According to an aspect of the disclosure, the switching element may be configured to enable and disable the potentiometer.

According to an aspect of the disclosure, the switching element may be a switch (for example a changeover switch) fixedly connected to a body of the device, wherein the power supply input, the regulation input, the potentiometer, and command output are fixedly connected to said body too, even if other embodiments are possible.

According to an aspect of the disclosure, when the device is in the second regulation mode and it is connected to an external device having an opened ON-OFF contact, it may be configured to output from the command output a command signal at a voltage value at which the selector element of potentiometer is set, otherwise, if the contact is closed, the command signal is based on the external signal generated by the external device.

In this way, according to an aspect of the disclosure, the device can be configured to act as an emergency by-pass (in particular when the switching element is in the external regulation mode, i.e., in the second regulation mode) and an external signal provided through the regulation input is interrupted, wherein the potentiometer is arranged and configured so as to provide the command signal based on the regulation thereof (i.e., based on the voltage regulation status thereof as set by the selector element) when the above interruption occurs.

Therefore, the device also provides a function for the automatic insertion on the 0-10 Vdc command output of the value at which the manual regulation selector element is set, in case of interruption or failure of the external command signal, so as to act as an emergency by-pass.

According to an aspect of the disclosure, the device can further comprise means adapted to amplify (and boost) an external 0-10 Vdc command, coming from an external device (i.e. a device connected to the device of the present disclosure, such as a local or remote master) via the regulation input, wherein the command output thereby provides a boosted and amplified command signal.

It is noted that, in the context of the present disclosure, the term "external" relates to a control device, for example delivering a 0-10 Vdc command, which interfaces with devices to be controlled through the device of the disclosure; they can be remote devices as well.

According to an aspect of the disclosure, the device can be adapted to act as a protection element of an external device to be regulated with the 0-10 Vdc and/or PWM command.

According to an aspect of the disclosure, the manual regulation potentiometer can be arranged between the power supply input and the command output to provide a manual voltage regulation towards the device to be controlled.

According to an aspect of the disclosure, the device can comprise means adapted to remodulate (amplify/reduce/limit) and/or stabilize an external 0-10 Vdc command coming from the regulation input.

Advantageously, the device allows to operate in different operational modes, for example as a master device which directly generates the adjustable 0-10 Vdc command, as a slave device, adapting the 0-10 Vdc input command to the power requirements of the system to be regulated, and with the booster function (which can be enabled in both modes) through which the regulation command is stabilized and amplified to manage in a continuous and efficient way the regulation of a 0-10 Vdc system (e.g., a proportional regulation).

According to an aspect of the disclosure, the power supply input can be adapted to be connected to a 24 Vac power supply, which is the most common one.

According to an aspect of the disclosure, the regulation input can be adapted to receive a command from an external device including a potentiometer, for example also having an ON-OFF contact switch.

According to an aspect of the disclosure, the regulation input can be adapted to receive a command from an external thermoregulator device, for example also having an ON-OFF contact switch.

In general, it is thus possible to associate any external device with the device of the disclosure, according to the needs.

As will be also detailed below, based on the status of the switch element (in particular when the device of the disclosure is set in the regulation condition through an external/remote device, i.e., in the second regulation mode), when complex external devices are not connected, but for example when only a simple device such as an external ON-OFF contact switch is connected, the command output behaves as follows based on the status of the external ON-OFF contact switch:

open configuration of the ON-OFF contact switch (open contact): the command output or command signal (i.e., 0-10 Vdc output) is set at the value of the manual regulation selector element; or closed configuration of the ON-OFF contact switch (closed contact): the devices to be regulated are controlled at 100% of the possibility with respect to the controlled parameter (i.e., at the maximum voltage, e.g. at 10 Vdc output).

As seen, a configuration with an external command is possible, for example with a device including its own potentiometer (remote manual command) or the above-described thermoregulator device (remote automatic command). Advantageously, by adopting the present solution, when the switching element (in particular the changeover switch) connected between the input and the output is in the external regulation condition (i.e., in the second regulation mode), the command output behaves as follows based on the status of a switch of the external device (e.g., an ON-OFF contact switch included in an external device such as an external potentiometer or an external thermoregulator):

open configuration of the ON-OFF contact switch (open contact): the command output or command signal is at the value at which the selector element of the manual regulation potentiometer is set; or closed configuration of the ON-OFF contact switch (closed contact): the command output or command signal is regulated by the external device.

In any case, the emergency by-pass function is always enabled since the interruption of the operation of the external device is comparable to an open contact.

According to an aspect of the disclosure, the device can comprise active protections and/or passive protections on the power supply input and/or on the regulation input and/or on the 0-10 Vdc and/or PWM command output.

Advantageously, this solution allows the user safety to be ensured, in ordinary and extraordinary situations, and allows both the regulation device and the devices connected thereto to be protected in case of failure.

The present disclosure also relates to a system comprising at least one regulation device of the above-described type and at least one electric/electrical device connected to the at least one command output of said regulation device and which is to be regulated via said regulation device.

According to an aspect of the disclosure, the electric/electrical device may be at least one fan including a control motor connected at the at least one 0-10 Vdc and/or PWM command output of the regulation device disclosed above.

Obviously, this system can also comprise remote (external) regulation devices (such as for example the above external device including a potentiometer and/or thermoregulator device, or any other device) which interface with the fans through the device of the present disclosure, as detailed below.

Advantageously, this solution allows the optimal parallel control of groups of fans based on the user needs and based on possible drawbacks in the operating step, with the protection of the whole equipment.

According to an aspect of the disclosure, the system can comprise a plurality of fans forming a network managed by the device.

According to an aspect of the disclosure, the at least one fan of the system can be configured to absorb a current in the range between 0.1 mA and 12 mA. These solutions are the most common ones in use.

According to an aspect of the disclosure, the system can be a food display comprising a support structure and a food display area, the display area being in communication with a fan system controlled by the device of the disclosure.

As mentioned, according to an aspect of the disclosure, the system may comprise at least one ON-OFF contact switch removably connected to the regulation input, wherein:

when the ON-OFF contact switch is opened, the command signal output from the command output is at a voltage value at which the selector element of potentiometer is set, and when the ON-OFF contact switch is closed, the command signal output from the command output is at the maximum voltage possible (e.g., 10 Vdc).

According to an aspect of the disclosure, the system may comprise an external device, such as an external device including its own potentiometer or an external thermoregulator device (generally an external device emitting a regulation signal and including also an ON-OFF contact switch) removably connected to the regulation input (e.g., the pins thereof are connected to the regulation input), wherein the regulation input is adapted to receive a command signal from said external device, said external device comprising its own ON-OFF contact switch, wherein:

when the ON-OFF contact switch is opened, the command signal output from the command output is at a voltage value at which the selector element of potentiometer is set, and when the ON-OFF contact switch is closed, the command signal output from the command output is based on a voltage signal generated by said external device.

The features and advantages of the device according to the disclosure will become apparent from the following description of an exemplary embodiment thereof given by way of non-limiting example with reference to the accompanying drawings.

BRIEF DESCRIPTION OF THE FIGURES

In the figures:

FIGS. 3A and 3B schematically show the device of the present disclosure, in an open configuration and in a closed configuration respectively, with a command signal from an external ON-OFF contact switch;

FIGS. 4A and 4B schematically show the device of the present disclosure, in an open configuration and in a closed configuration respectively, with an external command signal from a device including a potentiometer;

FIGS. 5A and 5B schematically show the device of the present disclosure, in an open configuration and in a closed configuration respectively, with an external command signal from a thermoregulator device;

FIG. 8 shows a possible rule of operation of the system of FIGS. 6 and 7.

DETAILED DESCRIPTION

With reference to the figures, a regulation device according to the present disclosure for the regulation of devices which can be regulated with a 0-10 Vdc and/or PWM command is globally and schematically indicated with the reference number 1.

It is worth noting that the figures represent schematic views and are not always drawn to scale, but they are instead drawn so as to emphasize the important features of the disclosure. Furthermore, in the figures, the different elements are represented in a schematic manner, their shape varying depending on the desired application. Moreover, it is worth noting that, in the figures, identical reference numbers refer to elements which are identical in shape or function. Finally, particular features described in relation to an embodiment illustrated in a figure can also be used for the other embodiments illustrated in the other figures.

Figure 1:
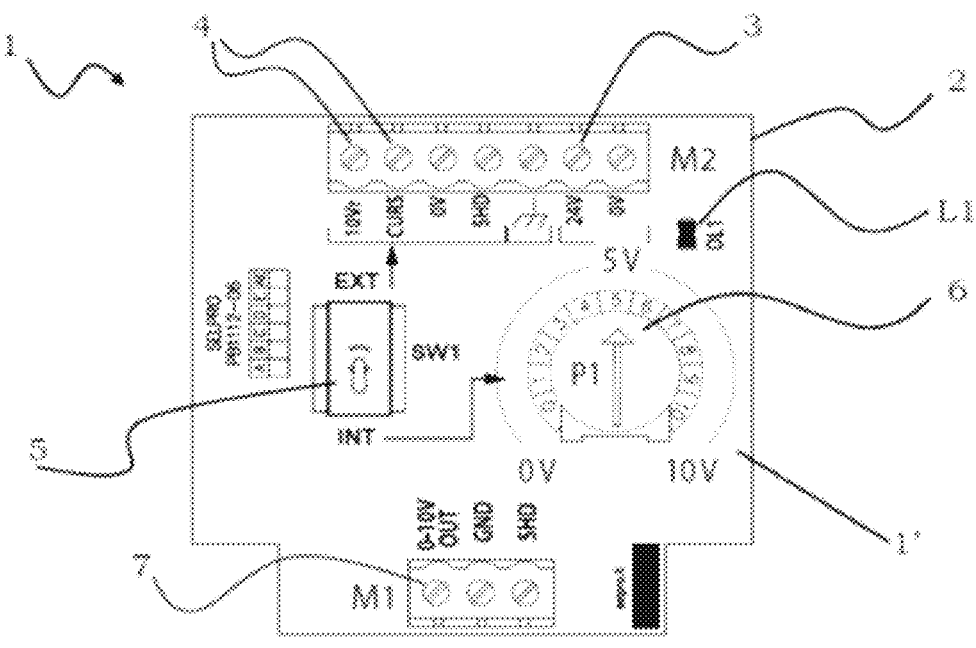
FIG. 1 shows a regulation device according to the present disclosure.

In particular, as can be seen in FIG. 1, the device 1 is manufactured from a printed circuit board 2, which is the body 1' of said device 1.

At least one power supply input 3, and a plurality of regulation inputs 4 adapted to receive external regulation signals (or external command signals), for example from remote devices with command signals of the 0-10 Vdc type, are provided on the printed circuit, as well as it can comprise other possible inputs. The supply input 3 may comprise a connection element for the mains or, less preferably, a housing for battery providing the requires power supply.

It is noted that, in the context of the present disclosure, the term "external" relates to a control device (e.g., to a remote or local master device) which interfaces with devices to be controlled by means of the device 1 of the invention.

The device 1 further comprises a switching element 5 configured to cause a switch of the device 1 between a first regulation mode (which is a manual regulation) and a second regulation mode (which is a regulation by an external device), said switching element 5 being functionally connected to a manual regulation potentiometer 6. The potentiometer 6 comprises a manual selector element (e.g., comprising a shaft moving a wiper) and it is arranged to provide a manual voltage regulation. In an embodiment, the switching element 5 is configured to enable or disable the potentiometer 6.

It is noted that, in the context of the present disclosure, the term "manual regulation" represents the regulation of the output command (for example the voltage regulation) which is selected by the user by acting on the potentiometer 6, in particular by moving the selector element thereof.

The device 1 also comprises at least one 0-10 Vdc command output (numeral reference 7) to control an associated device to be regulated, such as for example a fan motor. In another embodiment, the command output 7 can also provide a PWM command. In other words, the command output 7 is connected at least with the regulation input 4 and with the potentiometer 6 (connected in any suitable manner, directly or indirectly), and configured to produce a 0-10 Vdc and/or PWM command signal towards the devices to be regulated.

The switching element 5 (which can be for example a changeover switch fixed to the body 1' of the device 1) is thus adapted to allow switching from the first regulation mode, which allows a manual regulation of the command signal through said potentiometer 6, to the second regulation mode, which allows a regulation based on an external signal (for example from a remote device) received at the regulation input 4, and vice versa.

Obviously, both at the power supply input 3 and at the command output 7 a respective ground is provided, to ensure the standard safety of the device 1 for users.

As illustrated in the figures, several inputs (indicated for example with 0V and SHD) may be provided at the regulation input 4. In other words, the regulation input 4 may comprise a plurality of inputs.

The switching element 5 acts as a switch between the input and the output, opening and closing the relevant circuit, and the device operation varies depending on whether remote regulation signals are present or not at the regulation input 4. In any case, in an open configuration (position "INT" of FIG. 1), a command with a output value set by the potentiometer 6 is always enabled (first operation mode). Even when remote signals are present at the regulation input 4, it is thereby possible to interrupt the remote regulation and to activate the manual regulation by shifting the switching element 5 (e.g., by moving the switch from position "EXT" of FIG. 1 to the above mentioned position "INT"), changing at will the output voltage value by acting on the potentiometer 6 and thus changing the operation of the connected device to be controlled.

Otherwise, in the remote operation (second operating mode), the user can set a preset rule of operation for the device to be controlled and associated with the device 1 (for example a rule of operation that varies based on time variation or other parameters variation) and thereby control the operation of said associated device to be controlled through the external device connected to the regulation input of the device 1. Advantageously, this allows the operating parameters of the devices connected to the command output 7 to be remotely provided, following a preset rule of operation, as well as this allows the device operation to be switched into manual regulation if needed, so as to manage different specific operational requirements by simply acting on the potentiometer, obtaining a versatile, flexible and easy-to-use system which allows an optimal management with the 0-10 Vdc or PWM command of a single and/or of a network of electric and/or electronic actuators.

The device 1 is further equipped with active protections and/or passive protections on the power supply input 3, on the plurality of regulation inputs 4 and on the 0-10 Vdc and/or PWM command output 7, so as to ensure in the most suitable way the user safety, in ordinary and extraordinary situations, and to protect the device 1 and the connected operating devices in case of failure.

The device 1 thus acts as an electronic regulator with extended multifunctionality, converting the input power supply voltage (e.g., 24 Vac) to generate a 0-10 Vdc and/or PWM command (possibly an amplified command) towards one or more operating device to be controlled, such as EC fan motors, motor-driven actuators and generally devices which can be regulated with the 0-10 Vdc and/or PWM voltage command signal.

The device 1 can work in different operational modes, being adapted to amplify a remote command (e.g., 0-10 Vdc command) and/or to act as an emergency by-pass device and/or to remodulate a remote 0-10 Vdc command (even limiting it) and/or to act as a safeguard and protection element of a system regulated with the 0-10 Vdc command.

The device 1 can comprise means adapted to remodulate (amplify/reduce/limit) a remote 0-10 Vdc command coming from the regulation input.

In particular, suitably, the device 1 comprises means adapted to amplify (boost) a remote 0-10 Vdc and/or PWM command, the command output thus providing an amplified signal. The device 1 comprises electric components which are easily available, but combined in a new way to obtain all the above advantages, with a great convenience in the management and regulation operations.

As mentioned, the device 1 can be configured to act as an automatic and/or manual emergency by-pass when a remote command signal provided through the regulation input 4 is interrupted, wherein the potentiometer 6 is able to provide a command value (for example a command voltage) based on the regulation thereof when the above interruption occurs. More details related to this aspect will be provided below.

In other words, the device 1 thus also provides a function (e.g. a switch function obtained with electric components) for the automatic insertion on the command output 7 of the value at which the selector element of the manual regulation potentiometer 6 is set, in case of interruption or failure of the remote command signal, so as to act as an emergency by-pass, ensuring the regulation continuity and the intrinsic safety of the device 1 even in emergency.

Advantageously, the device allows to work in different operational modes, in particular as a master device, directly generating the adjustable command signal (e.g., 0-10 Vdc) wherein it is enough to simply connect the device 1 to a power supply source and it is able to generate the desired 0-10 Vdc and/or PWM voltage as a command signal, which can be adjusted at will—first regulation mode, or as a slave device adapting the command signal (e.g., 0-10 Vdc) input at the regulation input 4 to the power requirements of the system to be regulated—second regulation mode, and with the booster function of the received command signal which is enabled in both regulation modes and through which the regulation command signal is stabilized and amplified to manage in a continuous and efficient way the proportional regulation of a system to be regulated with the 0-10 Vdc and/or PWM command.

In an embodiment, the regulation command is stabilized, and possibly amplified from 0.1 mA to 20 mA, 60 mA and up to 200 mA. In fact there are also means to stabilize said command, outputting an always optimal regulation.

The device 1, in an embodiment, is equipped with a signalling LED L1 which indicates the status and/or the proper power supply of the device 1. However, nothing prevents not to provide this solution, or to provide a different signalling device to fulfil the same function.

Figure 2:
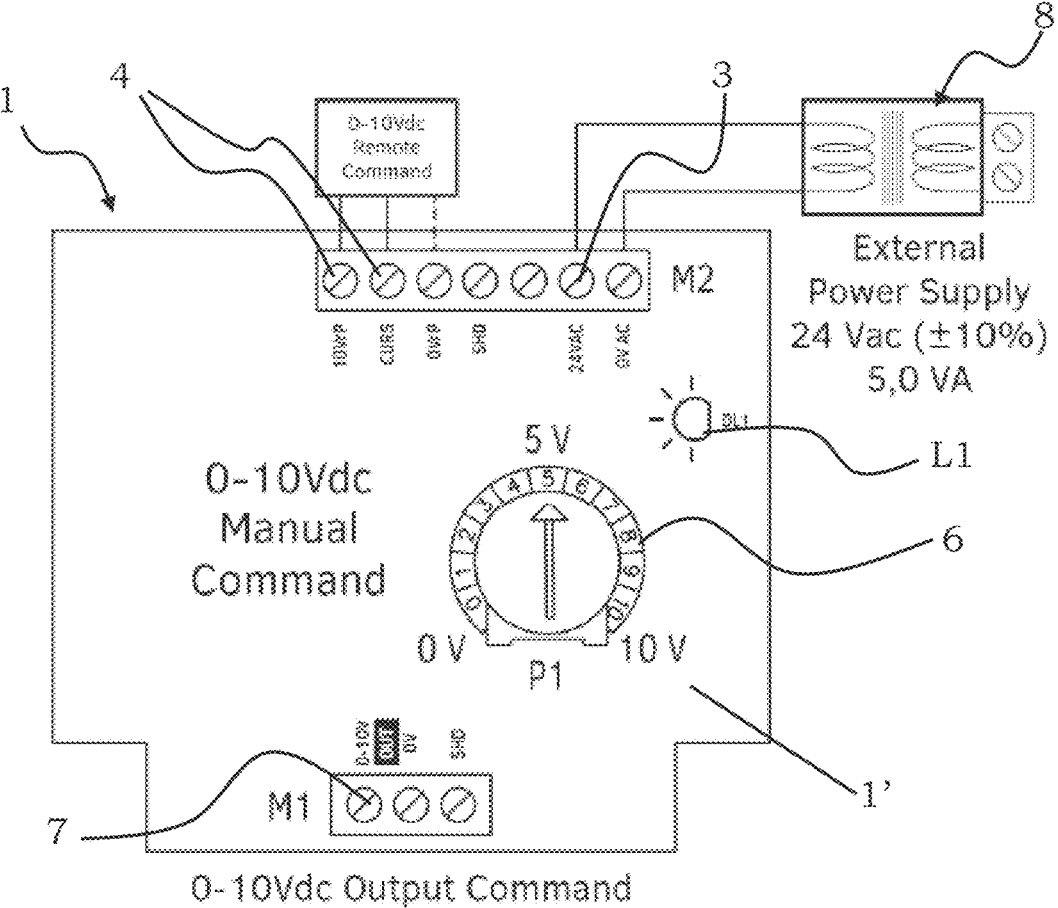
FIG. 2 schematically shows the regulation device of FIG. 1 connected to a 24 Vac power supply.

As can be seen in FIG. 2, the remote command connected to the regulation input 4 can be also in the voltage range of 0-10 Vdc.

Moreover, still referring to FIG. 2, the power supply input 3 can be adapted to be connected to a 24 Vac power supply 8, which is the most practical and most common power supply voltage for users.

In FIGS. 3A and 3B, the device 1 is shown connected to the power supply 8 and to an external ON-OFF contact switch (wherein the switching element 5 is in such a way that the device 1 is in the second regulation mode). In this example, The device 1, based on the position of the external ON-OFF contact switch (connected between CURS and 10VrP, i.e. between two inputs of the regulation input 4), behaves as follows:

open configuration (i.e., open ON-OFF contact): 0-10 Vdc and/or PWM output signal from the command output 7, said signal being at the value selected via the selector element of the potentiometer 6; or closed configuration (i.e. closed ON-OFF contact): operating devices controlled at 100%, i.e. with the maximum possible value.

Other remote command devices can be further associated with the device 1, in particular at the regulation input 4 thereof, depending on different regulation requirements. In general, it is thus possible to associate any remote device with the device of the invention according to the needs.

For example, in the second regulation mode, it is possible to connect to the regulation input 4 an external command device having its own an potentiometer (remote manual command) or a thermoregulator device (remote automatic command), both equipped with their own ON-OFF contact switch. Advantageously, by adopting the present solution, based on the status of said external devices, in particular based on the status of the ON-OFF contact switch of said external devices, command output 7 behaves as follows:

open configuration (open ON-OFF contact switch): emission of a 0-10V dc and/or PWM output command signal at the value at which the selector element of the manual regulation potentiometer is set; or closed configuration (closed ON-OFF contact switch): emission of a 0-10 Vdc and/or PWM output command regulated by the remote device.

In FIGS. 4A and 4B, for example, the device 1 is shown associated with an external device having a potentiometer 10, adopted as a variable resistive voltage divider, connected at the regulation input 4.

In this case, in the second regulation mode, based on the position of the ON-OFF contact switch connected in series between CURS and the selector element of the external potentiometer (i.e., between an input of the regulation input 4 and the external potentiometer), the command output 7 behaves as follows:

open ON-OFF contact switch: the 0-10 Vdc and/or PWM output command signal is output at the value at which the selector element of the manual regulation potentiometer 6 is set;

closed ON-OFF contact switch: the 0-10 Vdc and/or PWM output command signal is regulated by the external device 10, in particular by means of the external potentiometer.

As mentioned above, it is also possible to provide different external command devices.

For example, in FIGS. 5A and 5B the device 1 is shown associated with an external thermoregulator 11 device (and thus it is in this case a fully automatic regulation) connected at the regulation input 4.

In this case, based on the position of the ON-OFF contact switch connected in series between CURS and the external 0-10V master signal (i.e. between an input of the regulation input 4 of the device 1 and the external signal source 11), the 0-10 Vdc and/or PWM command output 7 behaves as follows:

open ON-OFF contact switch: the 0-10 Vdc and/or PWM output command signal is at the value at which the selector element of the manual regulation potentiometer 6 is set;

closed ON-OFF contact switch: the 0-10 Vdc and/or PWM output command signal is regulated by the external automatic signal passing through the thermoregulator 11.

Obviously, nothing prevents to adopt other external devices, individually or in combination with each other depending on the regulation specifications. Generally, any external device can be connected to the regulation input 4, wherein, in the second regulation mode, the output signal from the command output 7 of the device 1 is based on the status of said external device (e.g., based on the status of the ON-OFF contact and/or other regulation elements thereof).

In any case, in the shown examples, based on the status of the ON-OFF contact switch, it is possible to disable or enable the potentiometer 6.

It is also observed that the combination of the device 1 and one or more external device forms part of a system 100 that will be discussed below.

Besides the advantageous versatility, it is thus evident that the safety is also ensured, since, following the possible interruption of the remote devices or following breaking of the wirings connecting the external device to the regulation input, the circuit behaves as an open one and thus the command output 7 produces the 0-10 Vdc and/or PWM command signal, said command signal having a value (e.g., a voltage value) at which the selector element of the manual regulation potentiometer 6 is set, as indicated above (i.e. it is as like being in the first regulation mode, which is automatically activated).

As discussed above, the device 1 can be adopted in several equipment, such as fan motors, motor-driven valves, motor-driven gates, slave units, thermoregulators, inverters, lighting systems, and the like. For example, it can be used to turn a fan on and/or off (ON-OFF), to adjust the speed (from 0% to 100%), wherein the emergency measures are always integrated in the device, ensuring the motor operation (even at 100%) in case of failure of the remote controller or in case of breaking of the command cable.

Figure 6:
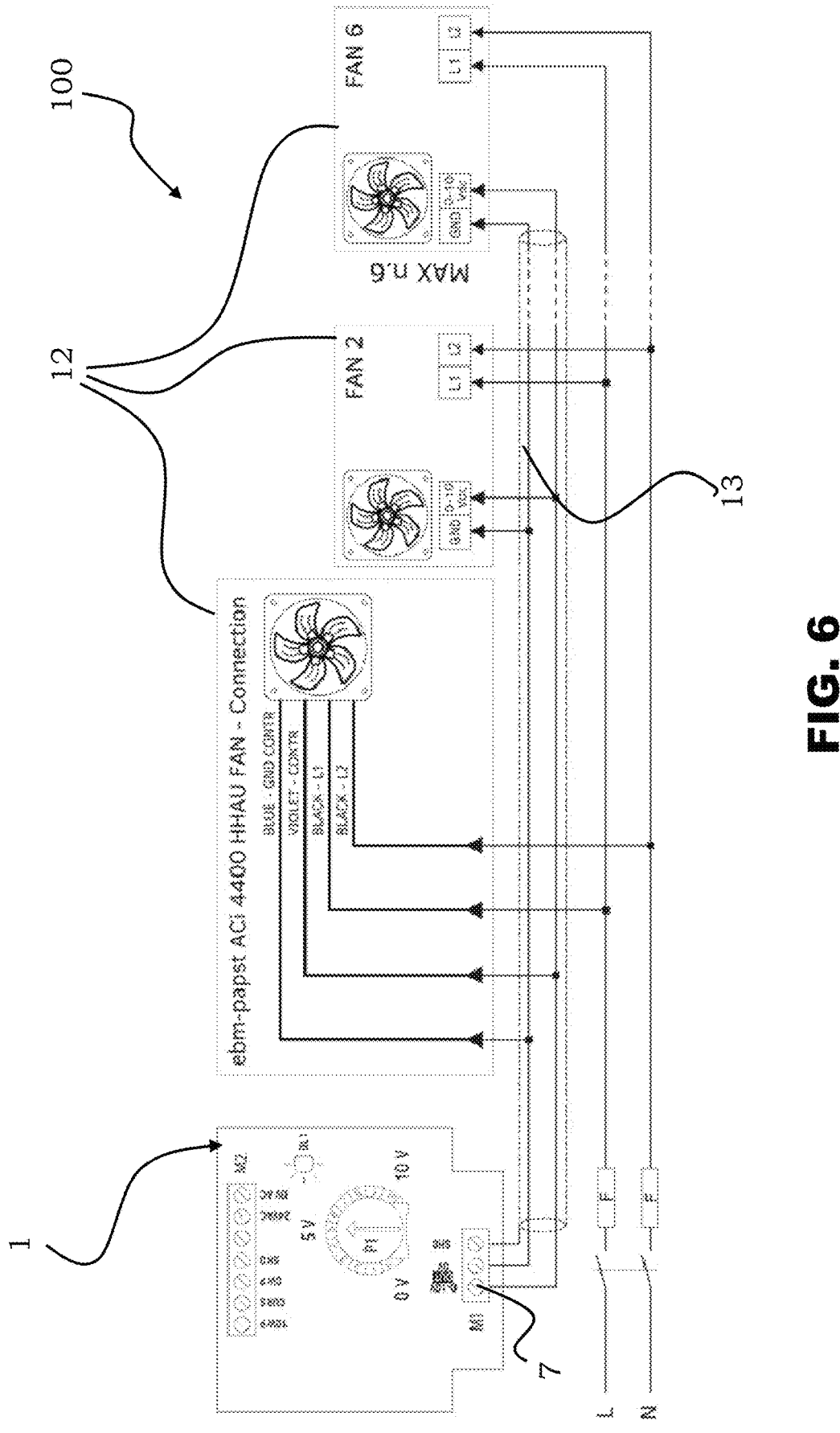
FIG. 6 schematically shows a system comprising the device according to the present disclosure.

As shown in FIG. 6, a system (identified with the reference 100) comprising a regulation device 1 and a device to be controlled is disclosed. In a preferred embodiment, the device to be controlled is a fan 12 provided with a motor, in particular a plurality of fans 12, generally axial fans, connected at the command output 7 of the device 1. According to an embodiment, the plurality of fans 12 are connected to a same ground line 13 of the device 1.

In other words, the present disclosure also relates to a system 100 comprising at least one device 1 according to the present invention and at least one device (for example a fan 12 having a control motor) connected at the at least one 0-10 Vdc and/or PWM command output 7 of said device 1. Obviously, the system 100 can also comprise external devices outside the device 1 (such as the above device with a potentiometer or thermoregulator) which interface with the fans 12 through the device 1 of the present invention. The system 100 can thus comprise a plurality of fans 12 forming a network managed by said device 1.

In the present embodiment, each fan of the plurality of fans 12 absorbs a current from the command signal, for example of 8 mA, which can be widely adopted for all the main voltages between 90 and 600 Vac.

Based on the sum of the values of the current (mA) absorbed by the single electric and/or electronic actuators connected to regulation device and forming a network, the connection of a great number of said actuators (for example twenty-five fans) is allowed until not exceeding the total current (in mA) indicated by the device specification. Obviously, nothing prevents the provision of different currents, even in view of possible technological developments.

Figure 7:
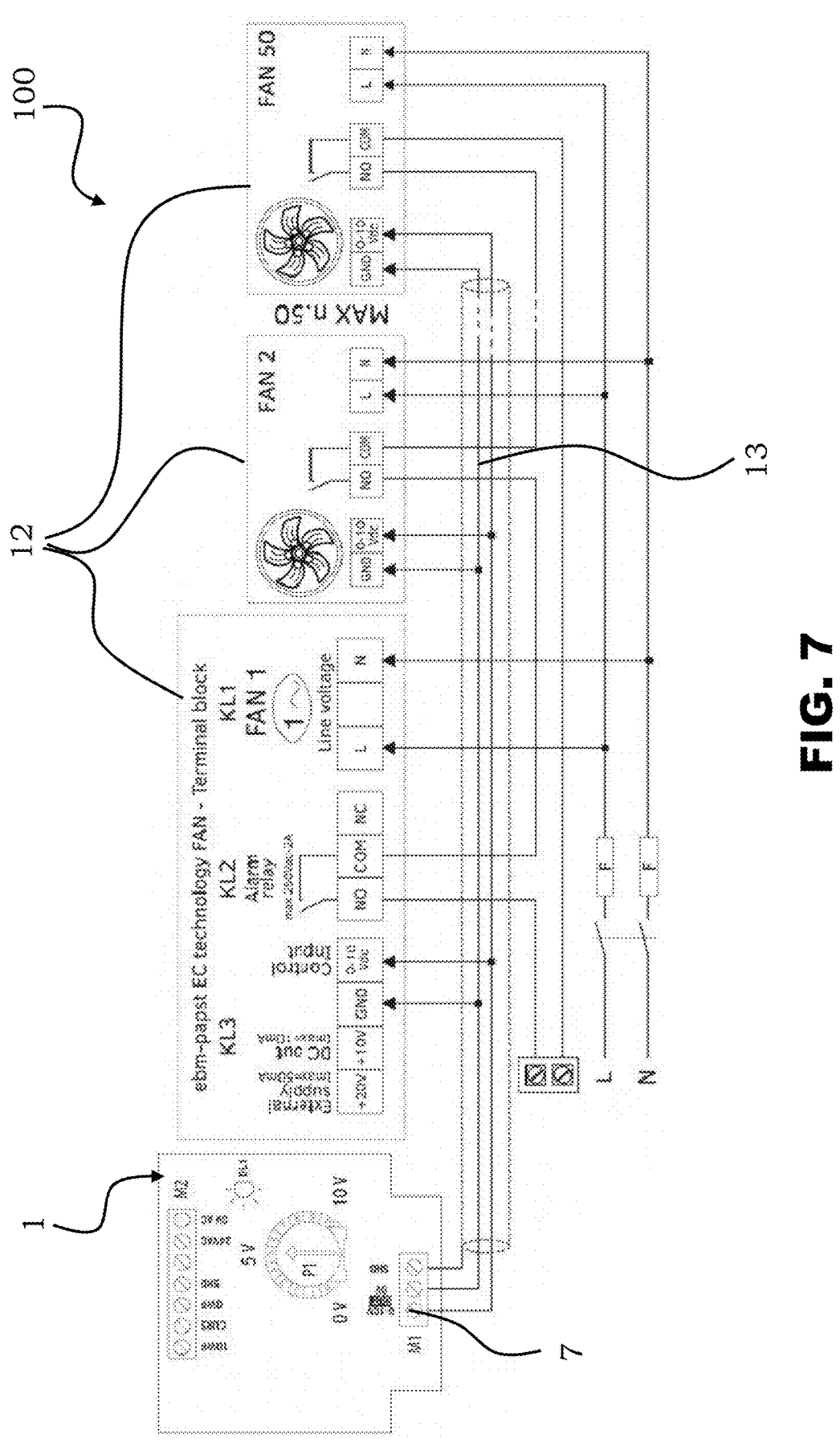
FIG. 7 schematically shows another system comprising the device according to the present disclosure.

Another embodiment of the system 100 is shown in FIG. 7, wherein each fan of the plurality of fans 12 absorbs a current of 0.1 mA.

Clearly, all the current/voltages values shown in the figures are only examples and do not limit the present disclosure.

Figure 7A:
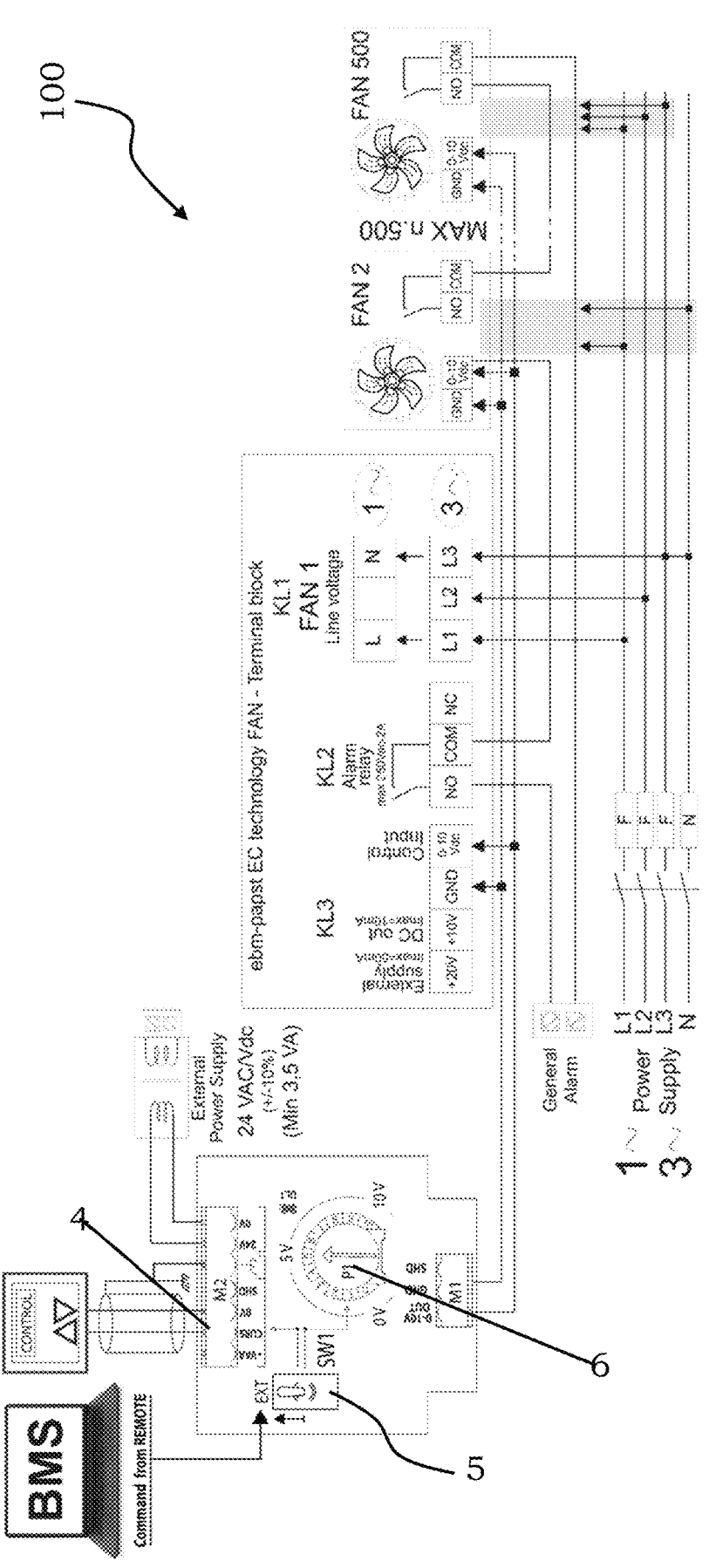
FIGS. 7A and 7B show various implementing solutions.
Figure 7B:
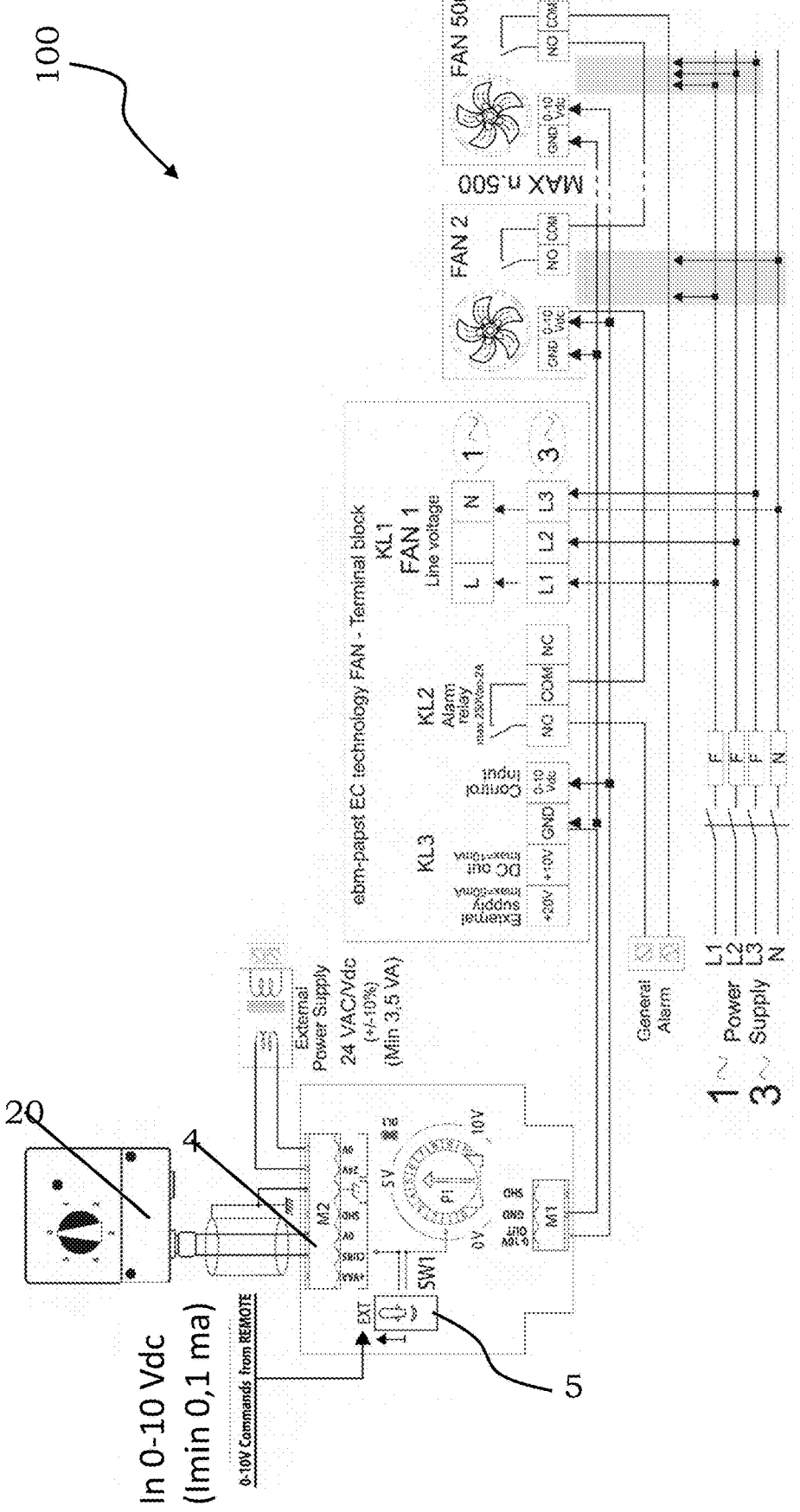

The remote command signal that is received by the regulation input 4 can be automatic or manual; FIG. 7A shows an exemplary connection of the device 1 with an EC fan of the EBM-Papst A3G type (absorbing 0.1 mA from the 0-10V command) and an automatic BMS control system connected to the input 4, with the switching element 5 in the second regulation mode (remote mode) with an automatic remote control, while FIG. 7B shows the same example, but with a manual remote control (i.e., wherein an external device 20 having its own regulation means is connected to the input 4 of the device 1).

Both for the 0-10 vdc regulation and for the PWM regulation, an analogue 0-10 Vdc signal can thus be provided at the input of the device 1, for example from a remote device, both with manual command and with automatic command.

A possible rule of operation remotely sent for a plurality of fans 12 is shown in FIG. 8, when the manual regulation through the potentiometer 6 of the device 1 is not used. Suitably, the device 1, thanks to the above features, ensures the operation on the whole operating range of the controlled device (e.g., the controlled motor) and the compliance with the operational diagram of modern motors (the example shows the ACi 4400 case).

Based on the different current values (mA) of the regulation signal generated by the device 1, the connection and the management up to two thousand fans are possible.

In this case too, the plurality of fans 12 can be connected to a same ground line 13 of the device 1.

In a preferred embodiment of the present disclosure, the system 100 is a refrigerated display for food (for example desserts) comprising also a support structure and a food display area, said food display comprising a fan system controlled by said device 1.

In these systems, it is important to ensure the full efficiency of the refrigeration system and the energy saving, optimizing the efficiency of the convector so as to limit at most the heat supply from the ambient air. EC fans can be used, where the aim is to keep the air flow at an optimal level and to limit the heat exchanges between the surrounding area and the displayed products, for which reason it is important to be able to regulate in a simple and effective way the fan with the 0-10V and/or PWM command.

Advantageously, the solution of the present disclosure allows the optimal control of groups of fans (for example with a current consumption of 8 mA) based on the user needs and based on possible drawbacks in the operating step with the protection of the whole equipment. The device 1 is able to generate or regulate the 0-10 Vdc and/or PWM command with a sufficient current, allowing many fans to be simultaneously regulated in a stable, efficient and continuous manner. All of this with a single component, which is small-sized and easy to install.

Advantageously, the present disclosure allows to ensure an optimized management of the operating devices to be regulated, for example the plurality of fans 12, connected to the device 1.

Furthermore, a rapid remodulation of the command is advantageously allowed, even by intervening in a direct manner, switching the operation from remote to manual and deciding an output command value which is suitable for the needs (e.g., by acting on the potentiometer).

Furthermore, the features of the device 1 allow a command continuity even in case of a partial failure of a system/plant, eliminating the risk of plant shutdown, possibly separating a unit portion connected to the device 1 and by-passing the remote command. In that case, as said, it is possible to preset an emergency speed and to ensure the operation continuity through the manual command.

Moreover, the device 1 and the corresponding system 100 meet the essential requirements of the guidelines concerning the compliance with the general standards for the industrial environment.

It is thus evident that the present disclosure achieves all the aims and obtains great technical advantages, also in terms of utility of use. A device with extended multifunctionality is provided, to manage in complete safety a 0-10 Vdc or PWM command of a network of actuators (for ex. EC fans, pumps, valves, gates, lights, etc.). It is configured to convert the power supply (for example 24 Vac) to generate the manual command, which can be regulated through the potentiometer 6 for managing the 0-10 Vdc or PWM command signal. It can also be inserted as a bridge system, as well as it can receive, stabilize, amplify/boost (for ex. from 0.1 mA to 20 mA, to 60 mA, even up to 200 mA) and protect the 0-10 Vdc command coming from an external master device (Bridge Function), or boost (for ex. 20 mA, 60 mA and 200 mA) the current of the command signal for regulating motor-driven actuators and/or systems in the 0-10 Vdc or PWM network. Many device to be controlled can be connected to the command output 7, creating a controlled network.

The switching element is configured to cause a switching of said device between a first regulation mode, in which the command signal is generated by said device itself and is manually adjustable through the selector element of said potentiometer, and a second regulation mode, which allows a regulation of the devices to be regulated via the command signal from the command output based on an external device connectable to the regulation input.

When the device is in the second regulation mode and it is connected to an external device having an opened ON-OFF contact (it may be an external device having the ON-OFF contact or it may be a simple ON-OFF contact switch not part of more complex devices), it is configured to output from the command output 7 a command signal at a voltage value at which the selector element of potentiometer 6 is set.

Therefore, also in the second regulation mode the potentiometer can be used, in particular when the ON-OFF contact is open, providing a safety measure in case of interruption of the external signal (an therefore this can be seen as an automatically switch, via internal components acting as switching element) from the second regulation mode to the first regulation mode.

Therefore, in case of problems on the input signal, the emergency by-pass automatically activates, which ensures the service continuity to the system being regulated, at the value of the set emergency command (e.g., at the value set by the potentiometer).

An appropriate regulation solution for a variety of applications is thus provided, with a single efficient and safe device (i.e., the device 1), for both the 0-10 Vdc and the PWM regulation.

In case of regulations with the 0-10 Vdc command, there may be a boost of the 0-10 Vdc command signal (which can be manual or automatic) for managing the network of electric actuators, in the above-discussed modes.

In case of regulations with the PWM (Pulse Width Modulation") command, the PWM command (being 25 KHz standard) can be directly generated, and/or the 0-10 Vdc input command signal (whether automatic or manual) can be converted to generate the boosted PWM command, towards the network of electric systems, such as for example EC fan motors, motor-driven actuators and devices which can be regulated with the PWM signal. The device can work in different operational modes, as a master, as a slave and always as a booster of the 0-10 Vdc input command signal, with integrated functions which ensure the regulation continuity and the enabled intrinsic safety of the system even in case of emergency, as described above. In the master function, it directly generates the PWM command which can be regulated from 0 to 100%, while in the slave function it converts the 0-10 Vdc input command and adapt the command signal to the requirements of the system to be regulated, boosting and stabilizing the command signal for the PWM network. With the booster function, which is always enabled in all modes, the regulation command is stabilized and amplified from 0.1 mA to 20 mA, to manage in a continuous and efficient manner the proportional regulation of the actuators in the PWM network. In this case there is thus an amplified conversion.

Obviously, in order to meet contingent and specific requirements, a person skilled in the art will be allowed to bring several modifications and alternatives to the above-described device, all falling within the scope of protection of the invention as defined by the following claims.

For example, nothing prevents the provision of a different number of command outputs which can be individually activated by several associated command devices, or a different arrangement of the adopted components, or even voltage values which are different from those provided above for the power supply.

The invention claimed is:

1. A device for the regulation of devices which can be regulated with a 0-10 Vdc and/or PWM command, said device comprising:

at least one power supply input;

at least one regulation input adapted to receive external regulation signals;

a potentiometer comprising a selector element, the potentiometer being configured to provide a manual voltage regulation; and at least one command output configured to output a command signal, for example of the 0-10 Vdc and/or PWM type, towards the devices to be regulated, wherein the device further comprises a switching element configured to cause a switching of said device between a first regulation mode, in which the command signal is generated by said device and is manually adjustable through the selector element of the potentiometer, and a second regulation mode, which allows a regulation of the devices to be regulated via the command signal from the command output based on an external device connectable to the regulation input, and wherein the device is configured to act as an emergency by-pass when an external signal provided through the regulation input is interrupted, wherein the potentiometer is arranged and configured to provide a command based on the regulation thereof when the above interruption occurs, the device further comprising means adapted to amplify an external dc command which comes from an external device via the regulation input, wherein the command output thereby outputs an amplified command.

2. The device according to claim 1, wherein, when the device is in the second regulation mode and it is connected to an external device having an opened ON-OFF contact, it is configured to output from the command output a command signal at a voltage value at which the selector element of potentiometer is set.

3. The device according to claim 1, wherein it is adapted to act as a protection element of a device regulated with a 0-10 Vdc and/or PWM command.

4. The device according to claim 1, wherein the potentiometer is arranged between the power supply input and the command output to provide a manual regulation of the voltage towards the device to be controlled.

5. The device according to claim 1, comprising means adapted to remodulate and/or stabilize an external 0-10 Vdc command from the regulation input.

6. The device according to claim 1, wherein the power supply input is adapted to be connected to a 24 Vac power supply.

7. The device according to claim 1, comprising active protections and/or passive protections at the power supply input and/or at the regulation input and/or at the command output.

8. A system comprising at least one device according to claim 1, and at least one electric/electrical device which is connected to the at least one command output of said device and which is to be regulated via said device.

9. The system according to claim 8, comprising at least one ON-OFF contact switch connected to the regulation input, wherein:

when the ON-OFF contact switch is opened, the command signal output from the command output is at a voltage value at which the selector element of potentiometer is set, and when the ON-OFF contact switch is closed, the command signal output from the command output is at the maximum voltage possible.

10. The system according to claim 8, comprising an external device connected to the regulation input, for example an external device including a potentiometer or an external thermoregulator device, wherein the regulation input is adapted to receive a command signal from the external device, the external device comprising an ON-OFF contact switch, wherein:

when the ON-OFF contact switch is opened, the command signal output from the command output is at a voltage value at which the selector element of potentiometer is set, and when the ON-OFF contact switch is closed, the command signal output from the command output is based on a signal generated by the external device.

11. The system according to claim 8, wherein the at least on electric/electrical device is at least one fan including a control motor.

12. The system according to claim 8, comprising a plurality of fans forming a network managed by said device, and/or wherein the at least one fan is configured to absorb a current in the range between 0.1 mA and 12 mA.

13. The system according to claim 8, wherein it is a food display comprising a support structure and a food display area, said display area being in communication with a fan system controlled by said device.

\*    \*    \*    \*    \*